(12) United States Patent
Fujiwara

(10) Patent No.: US 9,849,857 B2
(45) Date of Patent: Dec. 26, 2017

(54) SIDE AIRBAG DEVICE FOR VEHICLE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 14/901,621

(22) PCT Filed: Jun. 6, 2014

(86) PCT No.: PCT/JP2014/065160
§ 371 (c)(1),
(2) Date: Dec. 28, 2015

(87) PCT Pub. No.: WO2015/001912
PCT Pub. Date: Jan. 8, 2015

(65) Prior Publication Data
US 2016/0368449 A1    Dec. 22, 2016

(30) Foreign Application Priority Data

Jul. 3, 2013  (JP) .................................. 2013-139720

(51) Int. Cl.
*B60R 21/231* (2011.01)
*B60R 21/2338* (2011.01)
(Continued)

(52) U.S. Cl.
CPC ...... *B60R 21/23138* (2013.01); *B60R 21/231* (2013.01); *B60R 21/233* (2013.01);
(Continued)

(58) Field of Classification Search
CPC ............ B60R 21/23138; B60R 21/264; B60R 21/237; B60R 21/2334; B60R 21/233;
(Continued)

(56) References Cited

U.S. PATENT DOCUMENTS 9,669,789 B2 * 6/2017 Fujiwara ............... B60R 21/207
9,751,491 B2 * 9/2017 Sugimura ............. B60R 21/233
(Continued)

FOREIGN PATENT DOCUMENTS

JP        2008-201172 A     9/2008
JP        2008-201175 A     9/2008
(Continued)

*Primary Examiner* — Karen Beck
(74) *Attorney, Agent, or Firm* — Oliff PLC

(57) ABSTRACT

In the side airbag device, in an inflation and deployment state of the side airbag, a tension cloth extendingly disposed across between a front-rear partition and a rear end of the rear bag section is stretched, thereby restricting inflation in the vehicle front-rear direction of the rear bag section. An inflating width in a vehicle width direction of the rear bag section can be increased without significantly changing a position in the vehicle front-rear direction of the front-rear partition. In a flat developed state of the side airbag, the tension cloth is extendingly disposed across between the front-rear partition so folded into two as to protrude toward the rear bag section, and the rear end of the rear bag section. Accordingly, dimensions of each component can be so defined as to cause no redundancy in the rear bag section in the flat developed state, thus compactly folding the side airbag.

14 Claims, 8 Drawing Sheets

(51) Int. Cl.
*B60R 21/233* (2006.01)
*B60R 21/2334* (2011.01)
*B60R 21/237* (2006.01)
*B60R 21/264* (2006.01)

(52) U.S. Cl.
CPC ........ *B60R 21/237* (2013.01); *B60R 21/2334* (2013.01); *B60R 21/2338* (2013.01); *B60R 21/264* (2013.01); *B60R 2021/23146* (2013.01); *B60R 2021/23308* (2013.01); *B60R 2021/23382* (2013.01)

(58) Field of Classification Search
CPC .............. B60R 21/2338; B60R 21/231; B60R 2021/23382; B60R 2021/23308; B60R 2021/23146
USPC ........................................................ 280/729
See application file for complete search history.

(56) References Cited

U.S. PATENT DOCUMENTS

| | | | | |
|---|---|---|---|---|
| 2012/0025499 | A1* | 2/2012 | Shibayama | B60R 21/233 280/730.2 |
| 2015/0158453 | A1* | 6/2015 | Fujiwara | B60R 21/207 280/730.2 |
| 2017/0253213 | A1* | 9/2017 | Fujiwara | B60R 21/23138 |

FOREIGN PATENT DOCUMENTS

| | | | | |
|---|---|---|---|---|
| JP | 2011240807 | A | | 12/2011 |
| JP | 2012-025182 | A | | 2/2012 |
| JP | 2014-031051 | A | | 2/2014 |
| JP | 2014-031096 | A | | 2/2014 |
| JP | 2014141159 | A | * | 8/2014 ........... B60R 21/233 |

* cited by examiner

SIDE AIRBAG DEVICE FOR VEHICLE

TECHNICAL FIELD

The present invention relates to a side airbag device for a vehicle.

BACKGROUND ART

In a side airbag device described in the following Patent Literature 1, a side airbag is partitioned into a first inflating section (rear bag section) and a second inflating section (front bag section) by a partition wall (front-rear partition) disposed at a position corresponding to a rib region of an occupant in position. An inflator is provided inside the first inflating section, and gas generated from the inflator is supplied through communicating ports formed in the front-rear partition into the front bag section. With such a configuration, the rear bag section is set to have a higher pressure than that of the front bag section, thereby securing an initial restraint performance for an occupant in position, and also suppressing influence on the occupant even if the occupant is in an inappropriate position (out of position). Examples of the conventional technology relating to the present invention include the following Patent Literatures 2 to 6.

CITATION LIST

Patent Literature

Patent Literature 1: Japanese Patent Application Publication No. 2012-025182
Patent Literature 2: Japanese Patent Application Publication No. 2011-240807
Patent Literature 3: Japanese Patent Application Publication No. 2008-201172
Patent Literature 4: Japanese Patent Application Publication No. 2008-201175
Patent Literature 5: Japanese Patent Application Publication No. 2014-031096
Patent Literature 6: Japanese Patent Application Publication No. 2014-031051

SUMMARY OF THE INVENTION

Technical Problem

In the aforementioned side airbag, a position in the vehicle front-rear direction of the front-rear partition is determined by an inflating width in the vehicle front-rear direction of the rear bag section. The inflating width in the vehicle front-rear direction of the rear bag section is varied depending on an inflating width in a vehicle width direction of the rear bag section. When gas is supplied into the rear bag section, the pressure of the gas is uniformly applied onto an inner surface of the rear bag section; therefore, if the inflating width in the vehicle width direction of the rear bag section is changed, the inflating width in the vehicle front-rear direction of the rear bag section is also changed, so that the position in the vehicle front-rear direction of the front-rear partition is varied. In order to avoid this, flexibility in setting of the inflating width in the vehicle width direction of the rear bag section becomes lower; therefore, there is room for improvement in the light of enhancement of the occupant restraint performance of the side airbag.

Considering the above facts, an object of the present invention is to attain a side airbag device for a vehicle capable of enhancing an occupant restraint performance of a side airbag in which a front bag section and a rear bag section are partitioned by a front-rear partition.

Solution to Problem

A side airbag device for a vehicle according to a first aspect of the present invention includes: a gas generator provided to a vehicle seat, the gas generator activated so as to generate gas for inflation and deployment; and a side airbag partitioned by a front-rear partition in a sheet shape into a front bag section and a rear bag section, the side airbag housed in a folded-up state in a side section of a seat back of the vehicle seat, the side airbag brought to inflate and deploy toward a vehicle front direction of the side section by supplying the gas for inflation and deployment into each of the bag sections, wherein in a flat developed state of the side airbag, the front-rear partition is folded into two in a manner as to protrude toward the rear bag section along a folded portion thereof located at a center portion in a width direction, and a stretchable member is extendingly disposed across between the front-rear partition and a rear end of the rear bag section, and in an inflating and deploying state of the side airbag, the stretchable member is stretched so as to restrict inflation in a vehicle front-rear direction of the rear bag section.

In the first aspect, when a side impact of the vehicle is detected or foreseen, for example, the gas generator is actuated. The gas from the gas generator is then supplied into the front and rear bag sections of the side airbag so as to bring the side airbag to inflate and deploy. In the inflating and deploying state, the stretchable member extendingly disposed across between the front-rear partition and the rear end of the rear bag section of the side airbag is stretched. Therefore, the inflation in the vehicle front-rear direction of the rear bag section is restricted, and thus it is possible to increase the inflating width in the vehicle width direction of the rear bag section without significantly changing the position in the front-rear direction of the front-rear partition. As a result, it is possible to enhance the occupant restraint performance of the side airbag.

In addition, in a flat developed state of the side airbag, the stretchable member is disposed across between the front-rear partition folded into two in a manner as to protrude toward the rear bag section, and the rear end of the rear bag section. Thus, it is possible to define each component of the side airbag so as to cause no redundancy (sag) in the rear bag section in the flat developed state; therefore, it is possible to compactly fold the side airbag without becoming bulky.

In a side airbag device for a vehicle according to a second aspect of the present invention, in the first aspect, the stretchable member is connected to a center portion in a width direction of the front-rear partition.

In the second aspect, when the stretchable member is stretched, the central portion in the width direction of the front-rear partition is pulled toward the rear end of the rear bag section. Accordingly, it is possible to bring the rear bag section to inflate in the vehicle width direction in well balance.

In a side airbag device for a vehicle according to a third aspect of the present invention, in the first or second aspect, an entire or part of the stretchable member is configured by a rectifying member that rectifies the gas for inflation and deployment.

In the third aspect, the entire or part of the stretchable member is commonly used as the rectifying member, thus reducing the number of the components. Hence, it is possible to simplify a configuration of the side airbag by the reduced number of the components.

In a side airbag device for a vehicle according to a fourth aspect of the present invention, in the third aspect, the side airbag includes a lower bag section partitioned by an up-down partition from the front bag section and the rear bag section, and the gas for inflation and deployment is guided by the rectifying member forming the part of the stretchable member into the lower bag section.

In the fourth aspect, the rectifying member forming part of the stretchable member has a function to guide the gas for inflation and deployment into the lower bag section; therefore, it is possible to simplify the configuration of the side airbag including the lower bag section.

In a side airbag device for a vehicle according to a fifth aspect of the present invention, in the fourth aspect, the gas from the gas generator disposed inside the rear bag section is supplied into the lower bag section, and the side airbag is provided with a check valve that restricts a gas flow from an inside of the lower bag section to an inside of the rear bag section.

In the fifth aspect, the side airbag includes the aforementioned check valve, and thus it is possible to maintain the inner pressure of the lower bag section at a high pressure for a long time. Accordingly, it is possible to effectively restrain the lumbar region having a relatively high load resistance in the body of the occupant by the lower bag section, for example.

In a side airbag device for a vehicle according to a sixth aspect of the present invention, in any one of the first to fifth aspects, at upper and lower two portions on both sides of the front-rear partition with the stretchable member located therebetween or on either one side of the front-rear partition, there are formed a pair of communicating ports that communicate an inside of the front bag section and the inside of the rear bag section with each other, and the gas from the gas generator disposed inside the rear bag section is supplied through the pair of communicating ports into the front bag section.

In the sixth aspect, the aforementioned pair of communicating ports are formed in the front-rear partition. Hence, even in the configuration of providing the stretchable member across between the front-rear partition and the rear end of the rear bag section, it is possible to preferably supply the gas from the gas generator inside the rear bag section into the front bag section.

In a side airbag device for a vehicle according to a seventh aspect of the present invention, in the first aspect, a front end of the stretchable member branched into two if viewed from the up-down direction of the side airbag is connected to the front-rear partition.

In the seventh aspect, the front end of the stretchable member connected to the front-rear partition is branched into two if viewed from the up-down direction of the side airbag, and thus it is possible to prevent a tensile force inputted into the front-rear partition from being concentrated on a single position of the front-rear partition at the time of tensing the stretchable member. Accordingly, it is possible to suppress unprepared bending of the front-rear partition at the time of tensing the stretchable member (i.e., at the time of inflation and deployment of the side airbag).

In a side airbag device for a vehicle according to an eighth aspect of the present invention, in the seventh aspect, in the front-rear partition, communication ports that communicate the inside of the front bag section and the inside of the rear bag section with each other are formed between the branched front ends of the stretchable member.

In the eighth aspect, the aforementioned communicating ports are formed in the front-rear partition. Hence, even in the configuration of providing the stretchable member of which front end is branched into two across between the front-rear partition and the rear end of the rear bag section, the gas generated from the gas generator inside the rear bag section can be supplied to the center portion in the width direction in the front bag section. Accordingly, it is possible to stabilize the deploying behavior of the side airbag.

In a side airbag device for a vehicle according to a ninth aspect of the present invention, in any one of the first to eighth aspects, an upper portion of the front-rear partition is provided with an upper partition obliquely upwardly extending in a frontward direction of the seat back in the inflating and deploying state of the side airbag, and a front extending portion disposed above the rear bag section is partitioned from the front bag section by the upper partition.

In the ninth aspect, by setting the upper partition in the above manner, it is possible to suppress increase in volume of the rear bag section as well as preferably restrain the shoulder region of the occupant by the upper part of the rear bag section, that is, the front extending portion. For example, even if the form of the side impact is a so-called oblique side impact, and even if the occupant experiences inertial movement in the obliquely frontward direction of the vehicle, it is possible to prevent the shoulder region of the occupant from being out of the front extending portion. Therefore, regardless of the form of the side impact, it is possible to preferably restrain the shoulder region of the occupant by the side airbag.

Furthermore, the inward surface in the vehicle width direction of the front bag section in the inflating and deploying state is curved in such a manner that a portion upper than the center in the up-down direction thereof extends more outward in the vehicle width direction as it extends more upward. Accordingly, the side airbag and the occupant relatively come closer to each other due to impact of the side impact, so that the above curved surface comes into sliding contact with the upper arm region of the occupant, thereby generating a force to push up the upper arm region. As a result, the upper arm region is pushed upward of the front bag section, and is restrained by the front extending portion. Thus, it is possible to suppress intervention of the upper arm region between the chest region of the occupant and the side airbag, thereby reducing load onto the chest region.

In a side airbag device for a vehicle according to a tenth aspect of the present invention, in any one of the first to ninth aspects, the front-rear partition is configured by part of base fabrics of the front bag section or the rear bag section.

The tenth aspect is above configured; therefore, compared with the case of configuring the front-rear partition by a material of a different body from the base fabrics of the front bag section or the rear bag section, it is possible to simplify the configuration of the side airbag.

In a side airbag device for a vehicle according to an eleventh aspect of the present invention, in any one of the first to third aspects, the side airbag device further includes a rectifying member that is formed in a cylindrical shape, is disposed inside the rear bag section, and houses the gas generator thereinside, wherein the gas for inflation and deployment is supplied from upper and lower apertures of the rectifying member into the rear back section.

In the eleventh aspect, it is possible to bring the upper portion and the lower portion of the rear bag section to inflate and deploy at an earlier stage with a high pressure by the gas for inflation and deployment supplied from the upper and lower apertures of the rectifying member into the rear bag section.

In a side airbag device for a vehicle according to a twelfth aspect of the present invention, in any one of the first to eleventh aspects, in the flat developed state, dimensions of each component of the side airbag are so defined as to cause no redundancy in any of the front-rear partition, the base fabrics of the rear bag section, and the stretchable member.

The twelfth aspect is above configured; therefore, it is possible to contribute to the effect that enables compact folding of the side airbag without becoming bulky.

In a side airbag device for a vehicle according to a thirteenth aspect of the present invention, in the fifth aspect, the check valve is configured by the base fabrics of the rear bag section, and projects inside the lower bag section.

In the thirteenth aspect, the check valve that is configured by using the base fabrics of the rear bag section, and projects into the lower bag section is pressed and crushed due to increase in inner pressure of the lower bag section. Accordingly, it is possible to restrict the gas flow from the inside of the lower bag section into the rear bag section. In addition, the check valve is configured by using the base fabrics of the rear bag section; therefore it is possible to simplify the configuration of the side airbag.

In a side airbag device for a vehicle according to a fourteenth aspect of the present invention, in the thirteenth aspect, the rectifying member includes an outer rectifying member and an inner rectifying member each of which is formed in a cylindrical shape having apertures at upper and lower portions thereof, the outer rectifying member forms part of the stretchable member, and a lower portion of the outer rectifying member is inserted into the check valve, the inner outer rectifying member houses the gas generator thereinside, and a lower portion of the inner rectifying member is inserted into the outer rectifying member.

In the fourteenth aspect, the gas generated from the gas generator is rectified by the inner rectifying member and the outer rectifying member, and is then supplied into the rear bag section and the lower bag section. Hence, the dimensions and others of the inner rectifying member and the outer rectifying member are appropriately changed, thereby changing a distribution ratio of the gas into the rear bag section and the lower bag section.

Advantageous Effect of the Invention

As explained above, in the side airbag device for a vehicle according to the present invention, it is possible to enhance the occupant restraint performance of the side airbag in which the front bag section and the rear bag section are partitioned by the front-rear partition.

MODES FOR CARRYING OUT THE INVENTION

First Embodiment

A side airbag device for a vehicle 10 according to a first embodiment of the present invention will be explained with reference to FIG. 1 to FIG. 7. Arrow FR, Arrow UP, and Arrow OUT as appropriately described in each drawing indicate a frontward direction (advancing direction), an upward direction, and outward in a width direction of the vehicle, respectively. Hereinafter, in explanation simply using front-rear, and up-down directions, these will be indicated as front or rear in the front-rear direction of the vehicle, and up or down in the up-down direction of the vehicle, unless otherwise specified.

(Configuration)

Figure 1:
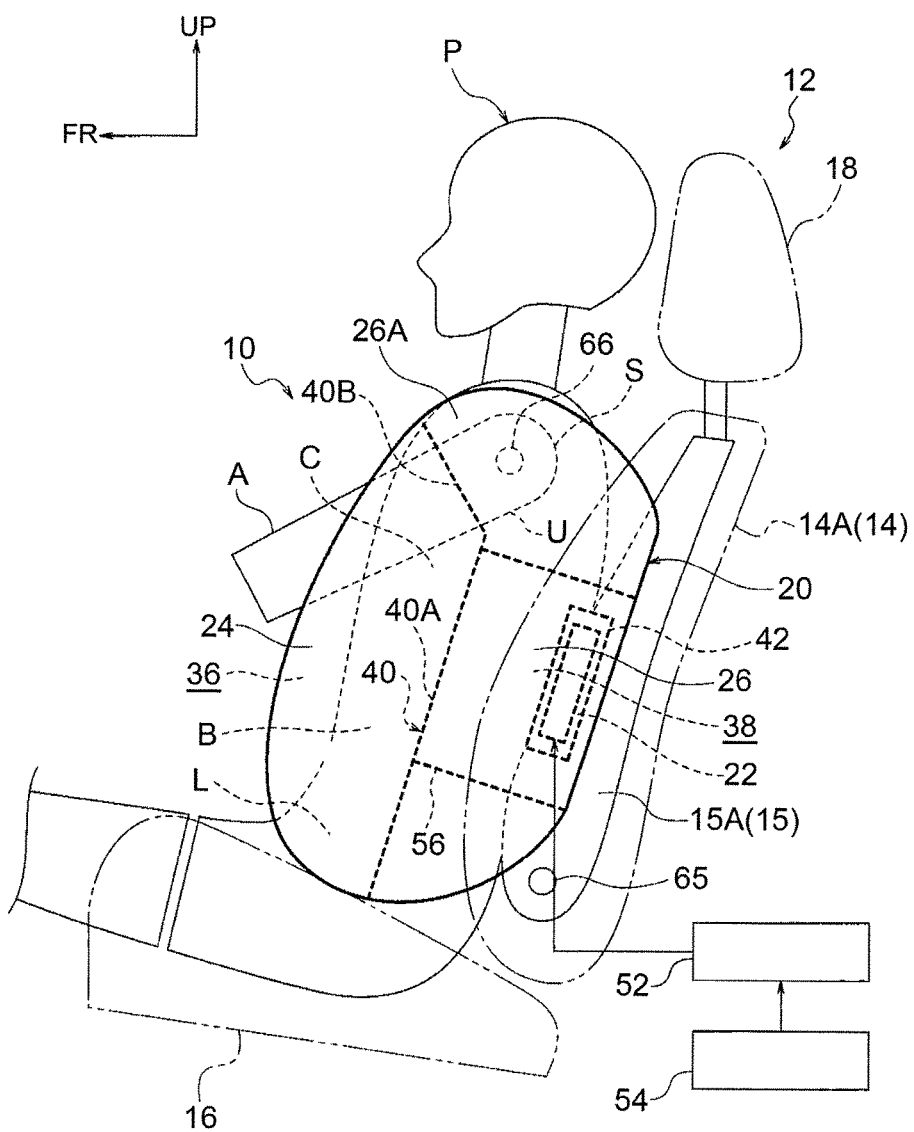
FIG. 1 is a side view of a vehicle seat configured by applying a side airbag device for a vehicle according to a first embodiment of the present invention, and is a drawing showing a state in which a side airbag inflates and deploys.

As shown in FIG. 1, the side airbag device 10 according to the first embodiment is mounted in a door-side side section 14A (a side section located outward in a vehicle width direction: a side section on the not-shown side-door side) of a seat back 14 in a vehicle seat 12. The seat back 14 is reclinably connected to the rear end of a seat cushion 16, and a headrest 18 is connected to an upper end thereof.

In the present embodiment, the front-rear direction, a right-left direction (width direction), and an up-down direction of the vehicle seat 12 coincide with a front-rear direction, a right-left direction (width direction), and an up-down direction of the vehicle. In FIG. 1, a dummy P for a side impact test is seated in the vehicle seat 12 instead of an actual occupant. The dummy P is an AM50 (model covering 50% of American adult males) of the WorldSID (World Side Impact Dummy), for example. Hereinafter, for convenience of explanation, the dummy P is referred to as an "occupant P".

The side airbag device 10 includes a side airbag 20 and an inflator 22 (gas generator) generating gas in the side airbag 20 as main components. The side airbag 20 is folded up in a unitized (modularized) state together with the inflator 22 and others, and is disposed (housed) inside the door-side side section 14A. The side airbag 20 inflates and deploys between the occupant P and the not-shown side door by a pressure of the gas generated from the inflator 22 (a state as shown in FIG. 1). At the time of the inflation and deployment, it is configured that a seat back pad and a seat outer skin (both not shown in the drawing) disposed to the door-side side section 14A receives an inflating pressure of the side airbag 20 so as to be fractured. The front-rear and up-down directions of the side airbag 20 as described in the following explanation indicate respective directions in a state where the side airbag 20 inflates and deploys, and substantially coincide with the front-rear and up-down directions of the seat back 14.

As shown in FIG. 1 to FIG. 5, the side airbag 20 is a so-called twin chamber side airbag configured such that an inside thereof is partitioned into a front section and a rear section, and a front bag section 24 and a rear bag section 26 are integrally stitched. The rear bag section 26 is formed by overlaying and stitching two base fabrics 28, 30 that are cut out of a nylon- or polyester-base cloth material, for example. Front end portions of the base fabrics 28, 30 are stitched at a seam T1, and upper end portions, lower end portions, and rear end portions thereof are stitched at an outer peripheral seam T2 defined at an outer periphery of the side airbag 20. In FIG. 1, the seams T1, T2, and seams T3 to T5 described later are not shown in the drawing.

The front bag section 24 is formed by overlaying and stitching two base fabrics 32, 34 formed of a similar cloth material to that of the base fabrics 28, 30. Upper end portions, front end portions, and lower end portions of the base fabrics 32, 34 are stitched at the outer peripheral seam T2, and the front portion of the rear bag section 26 is held between rear edges of the base fabrics 32, 34. The rear edges of the base fabrics 32, 34 are stitched to front portions of the base fabrics 28, 30 at the seams T3, T4.

Figure 2:
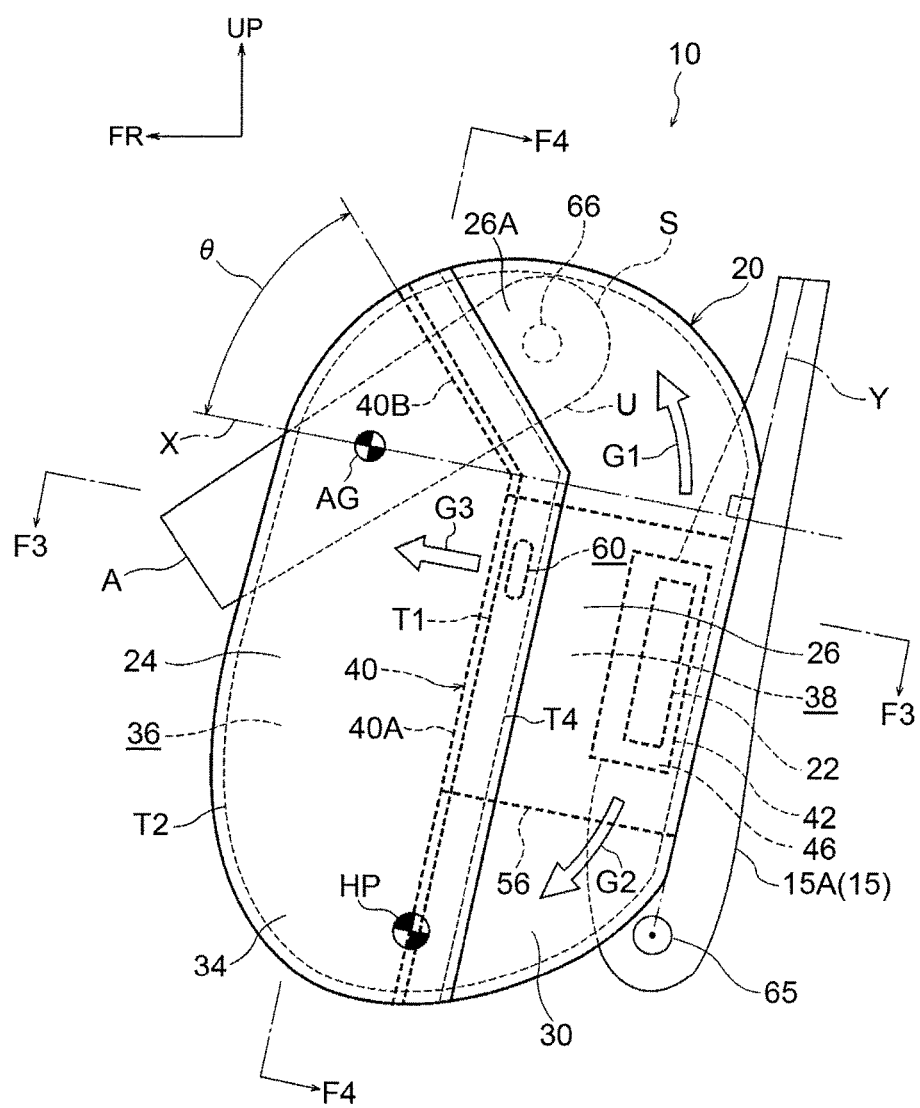
FIG. 2 is a side view showing an enlarged inflating and deploying state of the side airbag.

If the inflating and deploying state of the side airbag 20 is viewed in a side view as shown in FIG. 1 and FIG. 2, the side airbag 20 is formed in a substantially long oval shape extending in the up-down direction of the seat back 14, and is defined to be large enough to restrain a shoulder region S, a chest region C, an abdominal region B, and a lumbar region L of the occupant P. In the inflating and deploying state, the front bag section 24 is located at a vehicle frontward position of the rear bag section 26. An inside of the front bag section 24 is defined as a front chamber 36, and an inside of the rear bag section 26 is defined as a rear chamber 38.

The front bag section 24 and the rear bag section 26 are partitioned by a front-rear partition 40 (front-rear dividing tether) in a sheet shape, which is configured by part of the base fabrics 28, 30 (front portion of the rear bag section 26) that are disposed inside the side airbag 20. The front-rear partition 40 includes a vertical partition 40A extending in the up-down direction of the seat back 14, and an upper partition 40B (tilting partition) obliquely upwardly extending in a forward direction of the seat back 14 from an upper end of the vertical partition 40A.

The method of producing the side airbag 20 is not limited to the above, and may be appropriately changed. For example, it may be configured that a single base fabric is folded into two, an outer peripheral portion thereof is stitched into a bag body, and the front-rear partition is formed by using a tether (partition cloth) that is a different body from the base fabric in the bag form. For example, it may be configured that while the vertical partition is formed by using the above tether (partition cloth) that is the different body, the upper partition is formed by using the seam (stitched portion) where the base fabric in the bag form is stitched; and the configuration of the front-rear partition may be appropriately changed. Specifically, the front-rear partition may be formed in any manner as far as the front-rear partition is formed in a sheet shape.

Inside the rear bag section 26, there is provided a rectifying cloth 42 as a rectifying member. The rectifying cloth 42 is formed in a cylindrical shape by stitching a base fabric 46 (see FIG. 3) formed of a similar cloth material to that of the base fabrics 28, 30 or the like at a seam T5 (not shown in FIG. 1 and FIG. 2). The rectifying cloth 42 is disposed at a rear position of the rear bag section 26 in such a manner that an axial direction of the rectifying cloth 42 extends along the up-down direction of the seat back 14.

In addition, the inflator 22 is housed in the rear bag section 26. The inflator 22 is a so-called cylinder type inflator, and is formed in a cylindrical shape. The inflator 22 is disposed in the rear bag section 26 in such a manner that an axial direction of the inflator 22 extends along the up-down direction of the seat back 14, and is housed inside the rectifying cloth 42.

From an outer periphery of the inflator 22, a pair of upper and lower stud bolts 48 inwardly project in the vehicle width direction (inwardly in the seat width direction). The stud bolts 48 extend through the base fabrics 46, 28, and also through a side frame 15A of a seat back frame 15, and nuts 50 are screwed onto front ends of the stud bolts 48. Thus, the inflator 22 is fastened together with the side airbag 20 to be fixed to the side frame 15A (so-called side-fastening). It may be configured that the stud bolts projecting from the outer periphery of the inflator 22 in the vehicle rearward direction extend through the base fabrics 46, 28 and a bracket (a reaction force plate) having an L-shaped plan section fixed to the side frame 15A, and are then screwed to the nuts (so-called back-fastening).

As shown in FIG. 1, a side impact ECU 52 mounted in the vehicle is electrically connected to the inflator 22. A side impact sensor 54 to detect a side impact is electrically connected to the side impact ECU 52. The side impact ECU 52 is configured to actuate the inflator 22 when detecting (avoidance of) a side impact based on a signal from the side impact sensor 54. If a pre-crush sensor to foresee (predict) a side impact is electrically connected to the side impact ECU 52, the inflator 22 may be configured to be actuated when the side impact ECU 52 foresees the side impact based on a signal from the pre-crush sensor.

In addition, in the present embodiment, inside the rear bag section 26, there is provided a tension cloth 56 as a stretchable member (stretchable cloth: thickness restricting tether). The tension cloth 56 is formed by a similar cloth material in a rectangular shape to that of the base fabrics 28, 30 or the like, and a front edge thereof is stitched at the seam T1 to a central portion in the width direction of the front-rear partition 40, and a rear edge thereof is stitched at the outer peripheral seam T2 to a rear edge of the rear bag section 26. Specifically, this tension cloth 56 is extendingly provided across between both front and rear ends of the rear bag section 26. In the inflating and deploying state of the side airbag 20, the tension cloth 56 is disposed at a vicinity of a central portion in the up-down direction in the rear bag section 26 in such a manner that the thickness direction thereof extends along the vehicle width direction.

Figure 3:
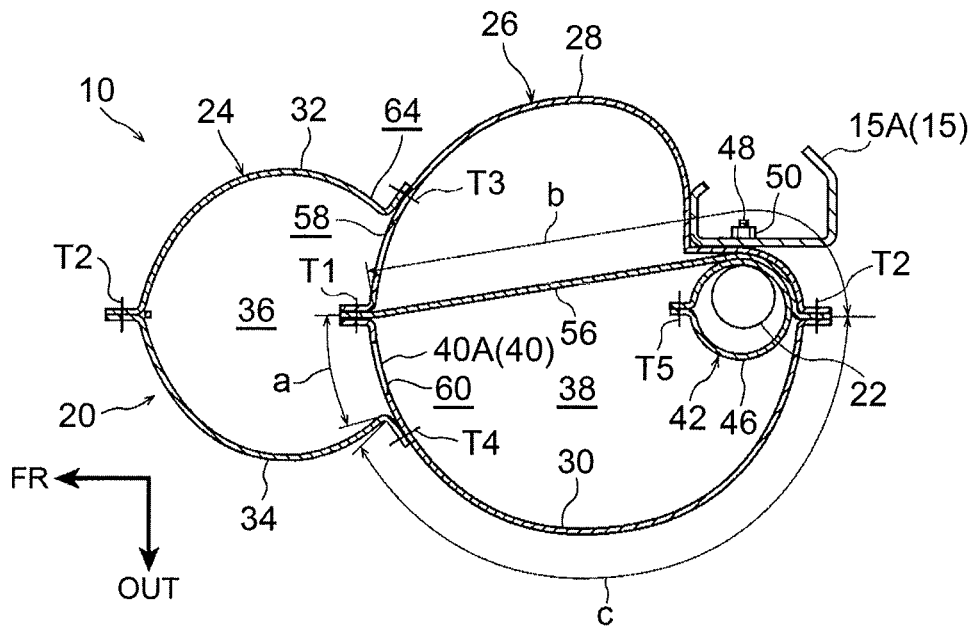
FIG. 3 is a sectional view showing a section taken along line F3-F3 of FIG. 2.

Part of the tension cloth 56 is held between the base fabric 28 and the rectifying cloth 42, and the upper and lower stud bolts 48 of the inflator 22 extend through the tension cloth 56. As shown in FIG. 3, in the front-rear partition 40, communicating ports 58, 60 (not shown in FIG. 1 and FIG. 2) are respectively formed at both right-left sides (both sides in the width direction) of the front-rear partition 40 with the tension cloth 56 located therebetween. Through the pair of communicating ports 58, 60, the inside of the front bag section 24 and the inside of the rear bag section 26 are communicated with each other. It may be configured that, in the front-rear partition 40, at two positions in the vertical direction on either one of the right and left sides (one side in the width direction) of the tension cloth 56, there are formed a pair of communicating ports that communicate the inside of the front bag section 24 and the inside of the rear bag section 26 with each other. The number of communicating ports, and foaming portions thereof in the front-rear partition 40 may be appropriately changed.

In the side airbag device 10 as above configured, when the inflator 22 is actuated, gas is radially injected from a gas injection port disposed at an upper end or a lower end of the inflator 22. The gas injected from the gas injection port is supplied from upper and lower apertures of the rectifying cloth 42 into the rear bag section 26 (see Arrows G1, G2 of FIG. 2). Part of the gas supplied into the rear bag section 26 is supplied through the communicating ports 58, 60 into the front bag section 24 (see Arrow G3 of FIG. 2). Therefore, the side airbag 20 inflates and deploys between the occupant P and the side section of the vehicle interior (herein, a not-shown door trim of the side door).

As shown in FIG. 1 and FIG. 2, in the state in which the side airbag 20 inflates and deploys, the front bag section 24 and the rear bag section 26 are arranged side by side in the vehicle front-rear direction. In the state, the front bag section 24 inflates and deploys laterally of the front part (front half) of the chest region C, the abdominal region B, and the lumbar region L of the occupant P, and the rear end of an upper edge (upper partition 40B) of the front bag section 24 is then disposed in the vicinity of the lower part of an underarm region U of the occupant P. On the other hand, the rear bag section 26 inflates and deploys laterally of the rear part (rear half) of the chest region C, the abdominal region B, and the lumbar region L of the occupant P, and a front extending portion 26A extends laterally from the shoulder region S of the occupant P to the vehicle frontward direction, and is disposed above the front bag section 24. Hereinafter, the side airbag 20 in the inflating and deploying state will be described in detail.

In the side airbag 20, when the rear bag section 26 inflates and deploys, the tension cloth 56 whose front end is stitched (connected) to the front end (front-rear partition 40) of the rear bag section 26, and whose rear end is stitched (connected) to the rear end of the rear bag section 26 is stretched in the vehicle front-rear direction. Therefore, the position in the vehicle front-rear direction of the front-rear partition 40 (vertical partition 40A) is restricted. The tension cloth 56 is defined such that a linear dimension in the vehicle front-rear direction of the side airbag 20 in the inflating and deploying state becomes shorter than an inflating width in the vehicle front-rear direction of the rear bag section 26 in the case of providing no tension cloth 56. Hence, in the present embodiment where the tension cloth 56 is extendingly provided across between the both front and rear ends of the rear bag section 26, the tension cloth 56 is stretched so as to restrict inflation of the rear bag section 26 in the vehicle front-rear direction, and also enlarge (increase) the inflating width in the vehicle width direction of the rear bag section 26.

The aforementioned linear dimension is unnecessary to coincide with a linear dimension b (see FIG. 3) described later as far as the linear dimension is defined in a manner as to restrict the inflation of the rear bag section 26 in the vehicle front-rear direction at the time of inflation and deployment of the side airbag 20.

By restricting the position in the vehicle front-rear direction of the front-rear partition 40 as described above, the front-rear partition 40 is configured to face a central portion in the front-rear direction (center in the front-rear direction or a vicinity of the center in the front-rear direction: a portion most outwardly expanding in the vehicle width direction) of the chest region C of the occupant P. Accordingly, it is configured that the front bag section 24 is located laterally of the front part of the chest region C, the abdominal region B, and the lumbar region L of the occupant P, and the rear bag section 26 is located laterally of the rear part of the chest region C, the abdominal region B, and the lumbar region L of the occupant P.

Figure 4:
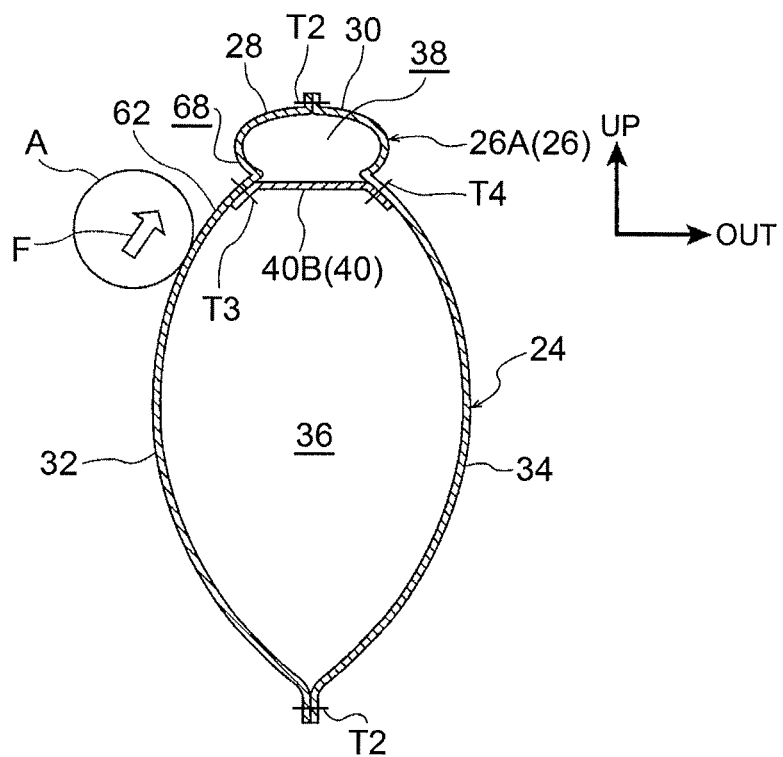
FIG. 4 is a sectional view showing a scale-reduced section taken along line F4-F4 of FIG. 2.

In the side airbag 20, the inflating width (dimension in the vehicle width direction; the same shall apply hereinafter) of the front part (front bag section 24) below the front extending portion 26A is defined to be smaller than the inflating width of the rear part (body of the rear bag section 26) below the front extending portion 26A. In the side airbag 20, the inflating width of the front extending portion 26A is defined to be smaller than the inflating width of the front bag section 24. By setting the inflating width of the front extending portion 26A to be smaller than the inflating width of the front bag section 24 as aforementioned, as shown in FIG. 4, the inward surface in the vehicle width direction at the upper portion of the front bag section 24 is configured as an upper arm pushing surface 62 that is curved in a manner as to extend more upward as it extends more outward in the vehicle width direction (extend more outward in the vehicle width direction as it extends more upward). The upper arm pushing surface 62 may be configured to be inclined in a manner as to extend more upward as it extends more outward in the vehicle width direction.

As shown in FIG. 1, the vertical partition 40A is provided in a manner as to extend in the up-down direction of the seat back along the central portion in the front-rear direction of the chest region C and the abdominal region B of the occupant P. In the vicinity of this vertical partition 40A, as shown in FIG. 3, there is formed a recessed portion 64 formed by the inward surface in the vehicle width direction of the side airbag 20 that is outwardly recessed in the vehicle width direction. The recessed portion 64 is extendingly disposed in the up-down direction of the seat back along the vertical partition 40A. The recessed portion 64 faces the central portion in the front-rear direction (i.e., the portion most outwardly expanding in the vehicle width direction) of the chest region C and the abdominal region B.

Meanwhile, the upper partition 40B is provided in a manner as to obliquely upwardly extend in the frontward direction of the seat back 14 from the upper end of the vertical partition 40A. Specifically, the upper partition 40B is more upwardly inclined as it extends toward the frontward direction of the seat back 14, relative to the front-rear direction of the seat back 14, that is, a direction (direction along a long dashed short dashed line X of FIG. 2) vertical to the up-down direction (direction along a long dashed short dashed line Y of FIG. 2) of the seat back 14 in a side view of the seat. The up-down direction of the seat back 14 denotes a direction extending through a center in the front-rear direction of an upper end of the seat back frame 15 and an axial center of a reclining rod 65 in the side view of the seat. An angle of inclination θ of the upper partition 40B relative to the front-rear direction of the seat back 14 is preferably defined to be within a range of 30° to 60°, and more preferably within a range of 40° to 50°.

If the inflating and deploying state of the side airbag 20 is viewed from the vehicle width direction, the upper partition 40B is defined to be located in the vicinity of a center between the center of the shoulder region S (an axial center of a bolt 66 disposed at the shoulder region S of the dummy P herein), and a central portion in the longitudinal direction of the upper arm region A (a position of a center of gravity AG of the upper arm region A or a position in the vicinity of the center of gravity AG) of the occupant P. By providing the upper partition 40B, the front extending portion 26A partitioned from the front bag section 24 is formed above the rear bag section 26. The front extending portion 26A inflates and deploys upward of the front bag section 24 so as to restrain the shoulder region S of the occupant P. In the vicinity of the upper partition 40B, as shown in FIG. 4, the inward surface in the vehicle width direction of the side airbag 20 is recessed outward in the vehicle width direction, thereby forming a recessed portion 68. The recessed portion 68 obliquely upwardly extends in the frontward direction of the seat back 14 along the upper partition 40B.

Figure 5:
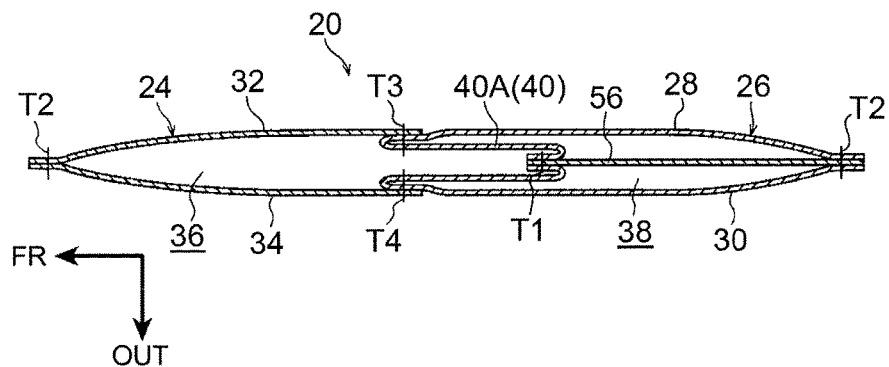
FIG. 5 is a sectional view corresponding to FIG. 3, and shows a flat developed state of the side airbag.

In the above configured side airbag device 10, as aforementioned, the side airbag 20 is folded up and put into a modularized state together with the inflator 22 and others, and is disposed inside the door-side side section 14A. At the time of folding the side airbag 20, the side airbag 20 is previously put into a flat developed state as shown in FIG. 5, and subsequently, the side airbag 20 is folded up with a predetermined folding method (such as roll folding and bellow folding). In FIG. 5, illustrations of the inflator 22 and the rectifying cloth 42 are omitted in the drawing.

Herein, in the present embodiment, in the flat developed state of the side airbag 20 as shown in FIG. 5, that is, if the side airbag 20 is developed in a flat state, the front-rear partition 40 (the vertical partition 40A and the upper partition 40B) is folded into two in a manner as to protrude toward the rear bag section 26 along a folded portion thereof located at the center portion in the vehicle width direction. In the state, dimensions of each component of the side airbag 20 are so defined as to cause no redundancy in any of the front-rear partition 40, the base fabrics 28, 30 of the rear bag section 26, and the tension cloth 56.

Specifically, in the present embodiment, in the plan sectional view as shown in FIG. 3, if a width dimension of the vertical partition 40A is defined as 2a, a linear dimension of the tension cloth 56 along the front-rear direction of the side airbag 20 is defined as b, and a dimension obtained by subtracting the above 2a from a circumferential length of the rear bag section 26 is defined as 2c, it is configured that a relation of a+b=c is satisfied.

(Operation and Effects)

Next, operation and effects of the first embodiment will be explained.

In the above configured side airbag device 10, when the side impact ECU 52 detects a side impact based on the signal from the side impact sensor 54, the inflator 22 is actuated by the side impact ECU 52. The gas injected from the gas injection port of the inflator 22 is then supplied into the front bag section 24 and the rear bag section 26 of the side airbag 20 so as to bring the side airbag 20 to inflate and deploy.

Therefore, the front part of the chest region C, the abdominal region B, and the lumbar region L of the occupant P is restrained by the front bag section 24, and the rear part of the chest region C, the abdominal region B, and the lumbar region L of the occupant P is restrained by the rear bag section 26. In this case, it is possible to bring the rear bag section 26 equipped with the inflator 22 thereinside to inflate and deploy earlier at a higher pressure than the front bag section 24.

Herein, in order to enhance the initial occupant restraint performance of the side airbag 20, it is effective to carry out the following. Specifically, the front-rear partition 40 disposed between the front bag section 24 and the rear bag section 26 is brought to face the central portion in the front-rear direction (portion most outwardly expanding in the vehicle width direction) in the side surface of the chest region C and the abdominal region B. Thus, load to be applied onto the front part of the chest region C and the abdominal region B is reduced. Meanwhile, the inflating width in the vehicle width direction of the rear bag section 26 is increased, thereby restraining the rear part of the chest region C and the abdominal region B (part on the back side) having a relatively higher load resistance at an earlier stage.

In this respect, in the present embodiment, when the side airbag 20 inflates and deploys, the tension cloth 56 disposed inside the rear bag section 26 is stretched so as to restrict the inflation of the rear bag section 26 in the vehicle front-rear direction. Therefore, the front-rear partition 40 is brought to face the central portion in the front-rear direction of the side surface of the chest region C and the abdominal region B of the occupant P, and at the same time, the inflating width in the vehicle width direction of the rear bag section 26 becomes enlarged. As a result, it is possible to reduce load to be applied onto the front part of the chest region C and the abdominal region B, and also bring the rear bag section 26 to come into contact with the rear part of the chest region C and the abdominal region B at an earlier stage, thereby enhancing the initial occupant restraint performance of the side airbag 20.

Specifically, by restraining the rear part of the chest region C and the abdominal region B having a relatively high load resistance by the rear bag section 26 at an earlier stage, it is possible to reduce load inputted from the front bag section 24 into the front part of the chest region C and the abdominal region B having a relatively low load resistance. In this manner, the body (upper body) of the occupant P is appropriately restrained in accordance with difference in the load resistance, thereby enhancing the initial occupant restraint performance of the side airbag 20. In addition, this can be coped with by only a slight change to set the tension cloth 56 inside the rear bag section 26; therefore, it is possible to attain a simple configuration.

Figure 6A:
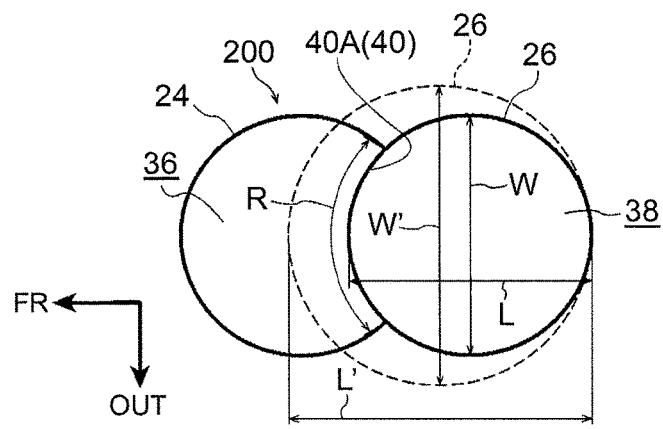
FIG. 6A is a schematic plan sectional view showing an inflating and deploying state of a side airbag according to a first comparative example.
Figure 6B:
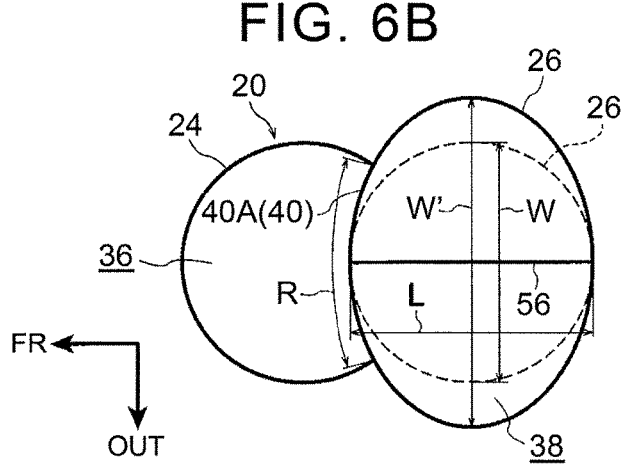
FIG. 6B is a schematic plan sectional view showing an inflating and deploying state of the side airbag according to the first embodiment.

A side airbag 200 (the first comparative example) as shown in FIG. 6(A) includes no tension cloth 56 of the present embodiment. Hence, if the inflating width in the vehicle width direction of the rear bag section 26 is increased from W to W', the inflating width in the vehicle front-rear direction of the rear bag section 26 is increased from L to L'; therefore, the position in the vehicle front-rear direction of the front-rear partition 40 is significantly changed. In order to prevent this, flexibility of defining the inflating width in the vehicle width direction of the rear bag section 26 becomes lowered. To the contrary, in the present embodiment, as shown in FIG. 6(B), the inflating width in the vehicle width direction of the rear bag section 26 can be increased from W to W' without significantly changing the position in the vehicle front-rear direction of the front-rear partition 40. As a result, it is possible to effectively enhance the occupant restraint performance of the side airbag 20. It should be notated that in FIG. 6(A) and in FIG. 6(B), a reference numeral R denotes the width dimension of the front-rear partition 40.

In the present embodiment, in the flat developed state of the side airbag 20, the front-rear partition 40 is folded into two in a manner as to protrude toward the rear bag section 26. Thus, it is possible to define dimensions of each component of the side airbag 20 so as to cause no redundancy (sag) in any of the base fabrics 28, 30 of the rear bag section 26 in the flat developed state, and thus it is possible to compactly fold the side airbag 20 without becoming bulky.

Figure 7:
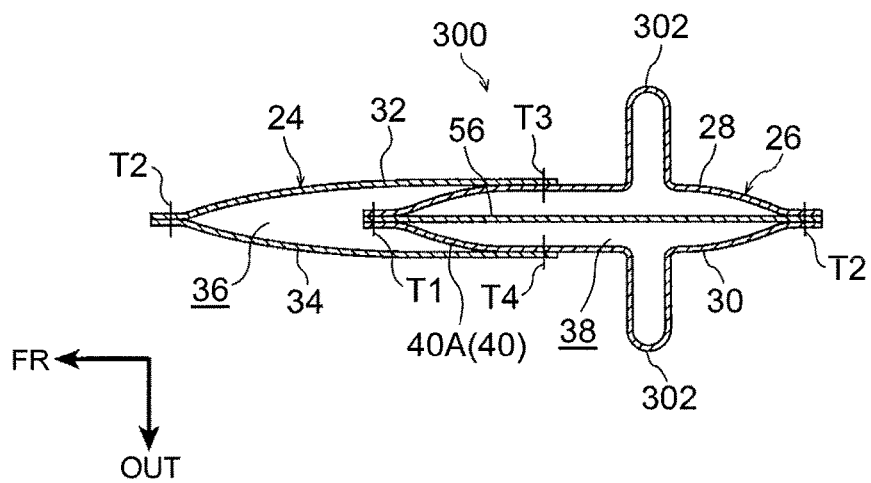
FIG. 7 is a sectional view corresponding to FIG. 5, and shows a flat developed state of a side airbag according to a second comparative example.

Specifically, as a side airbag 300 (the second comparative example) as shown in FIG. 7, in the configuration of folding the front-rear partition 40 into two in a manner as to protrude toward the front bag section 24, it is impossible to attain an effect to increase the inflating width in the vehicle width direction of the rear bag section 26 unless dimensions of each component of the side airbag 300 are so define as to cause redundancy 302 in the base fabrics 28, 30 of the rear bag section 26. Consequently, increase in bulkiness of the side airbag at the time of being folded becomes a problem, and it is difficult to secure mass productivity and quality; but in the present embodiment, it is possible to solve these problems. In addition, in the present embodiment, in the aforementioned flat developed state, dimensions of each component of the side airbag 20 are so defined as to cause no redundancy in any of the front-rear partition 40, the base fabrics 28, 30 of the rear bag section 26, and the tension cloth 56. Therefore, it is possible to further contribute to the effect to compactly fold the side airbag 20.

At the time of producing the side airbag device for a vehicle, a dedicated side airbag is define for every vehicle in accordance with a gap between the occupant and the side section of the vehicle interior, amount of lapping between the occupant and a B-pillar, and influence to the occupant in an inappropriate position (out of position), etc. In this respect, as the present embodiment, in the configuration of providing the tension cloth 56 inside the rear bag section 26, setting change of the dimension of the tension cloth 56 may be made for every vehicle, which makes it extremely easier to cope with every vehicle. In the light of securing an installation space in the vehicle seat, it is required to suppress bulkiness of the side airbag at the time of being folded to the minimum extent, but in the present embodiment, through the aforementioned configuration, it is possible to satisfy this requirement.

In addition, in the present embodiment, the front end of the tension cloth 56 is connected to the central portion in the width direction of the front-rear partition 40; therefore, when the tension cloth 56 is stretched, the central portion in the width direction of the front-rear partition 40 is pulled toward the rear end of the rear bag section 26. Accordingly, it is possible to bring the rear bag section 26 to inflate in the vehicle width direction in well balance.

In the present embodiment, the front extending portion 26A to restrain the shoulder region S of the occupant P is disposed above the rear bag section 26. The front extending portion 26A inflates and deploys at an earlier stage, thereby restraining the shoulder region S of the occupant P at an earlier stage. Furthermore, the front extending portion 26A is partitioned from the front bag section 24 by the upper partition 40B obliquely upwardly extending in the frontward direction of the seat back 14 from the upper end of the vertical partition 40A, and inflates and deploys upward of the front bag section 24. Specifically, the upper partition 40B obliquely upwardly extending in the frontward direction is set relative to the front-rear direction of the seat back 14 so that the upper part of the rear bag section 26 (front extending portion 26A) extends upward of the front bag section 24 so as to restrain the shoulder region S of the occupant P. By setting the upper partition 40B in this manner, it is possible to suppress increase in volume of the rear bag section 26 as well as bring the upper part of the rear bag section 26 (front extending portion 26A) to face the shoulder region S of the occupant P in a preferable manner. As a result, the rear part of the chest region C, the abdominal region B, and the lumbar region L as well as the shoulder region S can be effectively restrained; thus it is possible to enhance the restraint performance of the occupant P by the side airbag 20.

In addition, as shown in FIG. 4, the inward surface in the vehicle width direction of the front bag section 24 in an inflating and deploying state is curved in such a manner that a portion upper than the center in the up-down direction thereof extends more upward as it extends more outward in the vehicle width direction (see the upper arm pushing surface 62 as shown in FIG. 4). Accordingly, the side airbag 20 and the occupant P relatively come closer to each other due to impact of the side impact, so that the upper arm pushing surface 62 comes into sliding contact with the upper arm region A of the occupant P, thereby generating a force F to push up the upper arm region A. As a result, the upper arm region A is pushed upward of the front bag section 24, and is restrained by the front extending portion 26A. Therefore, it is possible to suppress intervention of the upper arm region A between the chest region C of the occupant P and the side airbag 20, thereby reducing load onto the chest region C.

In the present embodiment, if the inflating and deploying state of the side airbag 20 is viewed in the vehicle width direction, the upper partition 40B is located in the vicinity of the center between the center of the shoulder region S and the central portion in the longitudinal direction of the upper arm region A of the occupant P (in the vicinity of the center of gravity AG of the upper arm region A). Hence, compared with the case of setting the upper partition 40B to the vicinity of the center of gravity AG of the upper arm region A, it is possible to more preferably act the push-up force F relative to the upper arm region A by the front bag section 24 onto the vicinity of the center of gravity AG of the upper arm region A. Thus, it is possible to effectively push up the upper arm region A.

Specifically, if the upper partition 40B is disposed along the X line of FIG. 2, the upper partition 40B extends through the vicinity of the center of gravity AG of the upper arm region A. In the vicinity of the upper partition 40B, as shown in FIG. 4, the inward surface in the vehicle width direction of the side airbag 20 is outwardly recessed in the vehicle width direction so as to form the recess (valley) 68, and thus the recessed portion 68 comes into contact with the vicinity of the center of gravity AG of the upper arm region A. Because the recess portion 68 is formed at the upper end (upper terminal) portion of the upper arm pushing surface 62, the vicinity of the center of gravity AG of the upper arm region A has a shorter distance and shorter time to come sliding contact with the upper arm pushing surface 62, so that the push-up force F cannot be sufficiently acted onto the vicinity of the center of gravity AG of the upper arm region A. To the contrary, in the present embodiment, when the upper arm region A is about to come sliding contact with the upper arm pushing surface 62, the center of gravity AG is sufficiently apart downward from the recessed portion 68

(upper partition 40B), and thus it is possible to effectively act the push-up force F from the upper arm pushing surface 62 onto the vicinity of the center of gravity AG of the upper arm region A. As a result, it is possible to effectively push up the upper arm region A.

In addition, the front extending portion 26A extends laterally from the shoulder region S of the occupant P to the vehicle frontward direction so as to be located above the front bag section 24. Hence, for example, even if the form of the side impact is a so-called oblique side impact, and even if the occupant P experiences inertial movement in the obliquely frontward direction of the vehicle, it is possible to prevent the shoulder region S of the occupant P from being out of the front extending portion 26A. Therefore, regardless of the form of the side impact, it is possible to preferably restrain the shoulder region S of the occupant P by the side airbag 20, thereby maintaining the restraint of the shoulder region S until a latter half of the impact.

In the present embodiment, in FIG. 2, if the side airbag 20 is cut off along a line extending through the center (bolt 66) of the shoulder region S of the occupant P and the center of gravity AG of the upper arm region A, the recessed portion 68 is formed between the center of the shoulder region S and the center of gravity AG of the upper arm region A. The recessed portion 68 obliquely upwardly extends in the frontward direction of the seat back 14 along the upper partition 40B, and thus, at the front end portion of the front extending portion 26A, there is formed a curved surface that is curved more outward in the vehicle width direction as it extends more obliquely downward in the frontward direction of the seat back 14. Hence, when the inflating and deploying side airbag 20 and the occupant P relatively come closer to each other due to the impact of the side impact, along with the above described push-up effect relative to the upper arm region A, the shoulder region S of the occupant P located outward in the vehicle width direction moves toward the upper partition 40B (in the vehicle frontward direction) along the curved surface formed at the front end portion of the front extending portion 26A. As a result, the upper body of the occupant P is turned around a substantially vertical axis in a direction where the shoulder region S located outward in the vehicle width direction moves in the vehicle frontward direction, so that the back of the occupant P faces the side airbag 20 side. Thus, the back side having a relatively high load resistance can effectively be restrained by the side airbag 20. The chest region C is displaced (turned) in a direction away from the side airbag 20, thereby further reducing the load onto the chest region C. In addition, the shoulder region S located outward in the vehicle width direction is moved in the vehicle frontward direction to be fitted into the recessed portion 68, and thus the shoulder region S becomes difficult to be out of the front extending portion 26A that is a shoulder restraining portion; therefore, it is also possible to preferably maintain the restraint of the shoulder region S even at the time of oblique impact.

In the present embodiment, if the inflating and deploying state of the side airbag 20 is viewed in the vehicle width direction, the vertical partition 40A is so defined as to be extendingly disposed from a position overlapping a hip point HP toward the center of the shoulder region S to the lower portion of the underarm region U of the occupant P. Hence, the side surface of the chest region C and the abdominal region B of the occupant P can be restrained by the front bag section 24 and the rear bag section 26 in a manner as to be covered along the curved surface thereof from the front and rear thereof. Accordingly, it is possible to stabilize the positional relation in the vehicle front-rear direction between the chest region C and the abdominal region B, and the side airbag 20.

In addition, in the present embodiment, the intermediate portion in the front-rear direction of the side surface of the chest region C (i.e., the portion most outwardly expanding in the vehicle width direction) is fitted into the recessed portion 64 formed in the vicinity of the vertical partition 40A in the inflating and deploying state of the side airbag 20. Therefore, it is possible to reduce the load to be applied onto the chest region C (ribs or the like). The upper arm region A pushed up by the sliding contact with the front bag section 24 is fitted into the recessed portion 68 formed in the vicinity of the upper partition 40B. Accordingly, it is possible to preferably restrain the upper arm region A at the position where the upper arm region A is pushed up.

In the present embodiment, because the vertical partition 40A and the upper partition 40B are formed by part of the base fabrics 28, 30 (front-rear dividing tether), the inflating width in the vehicle width direction of the front bag section 24 and the rear bag section 26 can be increased by a width dimension of the tether. Accordingly, it is possible to preferably secure an impact absorption stroke of the front bag section 24 and the rear bag section 26.

In the present embodiment, in the vertical partition 40A, there are formed the pair of communicating ports 58, 60 with the tension cloth 56 disposed therebetween so as to mutually communicate the inside of the front bag section 24 and the inside of the rear bag section 26. The gas supplied from the inflator 22 disposed inside the rear bag section 26 is supplied through the pair of the communicating ports 58, 60 into the front bag section 24. Thus, in spite of the configuration of providing the tension cloth 56 extending across between the vertical partition 40A and the rear bag section 26, it is possible to preferably supply the gas generated from the inflator 22 inside the rear bag section 26 into the front bag section 24.

In addition, in the present embodiment, the front-rear partition 40 is formed by part of the base fabrics 28, 30 of the rear bag section 26. Hence, compared with the case of configuring the front-rear partition 40 by a material of a different body from the base fabrics 28, 30, 32, 34 of the front bag section 24 and the rear bag section 26, it is possible to simply the configuration of the side airbag 20.

In the present embodiment, since the gas injected from the inflator 22 is supplied from the upper and lower apertures of the rectifying cloth 42 into the rear bag section 26, it is possible to bring the upper portion and the lower portion of the rear bag section 26 to inflate and deploy at an earlier stage with a high pressure. As a result, it is possible to enhance the initial restraint performance of the shoulder region S and the lumbar region L of the occupant having a relatively high load resistance.

In the above first embodiment, if the upper partition 40B is configured by a seam (stitched portion), it is possible to enlarge the curve of the upper arm pushing surface 62; therefore, it is possible to increase the push-up force F acting on the upper arm region A. This feature is the same in the case of configuring the upper partition 40B by the tether having a smaller width than that of the vertical partition 40A.

In the above first embodiment, it is configured that the pair of the communicating ports 58, 60 are formed in the vertical partition 40A, and no communicating port is formed in the upper partition 40B, but the present invention is not limited to this. Specifically, it may be configured that each of the vertical partition 40A and the upper partition 40B is provided with one or plural communicating ports.

In the above first embodiment, it may be configured that a vent hole is formed in at least one of the front bag section 24 and the rear bag section 26, and the gas supplied into at least one of the sections is exhausted to the outside of the side airbag 20 through the vent hole. Therefore, it is possible to prevent the crashed remainder from being caused in at least one of them.

In the above first embodiment, it is configured that the tension cloth 56 that is a stretchable member is formed by a different body from the base fabrics 28, 30, 32, 34, but the present invention is not limited to this. Specifically, it may be configured that the entire or part of the stretchable member is integrally formed with the base fabrics of the front bag section or the rear bag section, that is, the entire or part of the stretchable member is formed by part of the base fabrics of the front bag section or the rear bag section.

Next, other embodiments of the present invention will be described. The same reference numerals are used for configurations and operations that are basically the same as those of the aforementioned first embodiment, and description thereof will be omitted.

Second Embodiment

Figure 8:
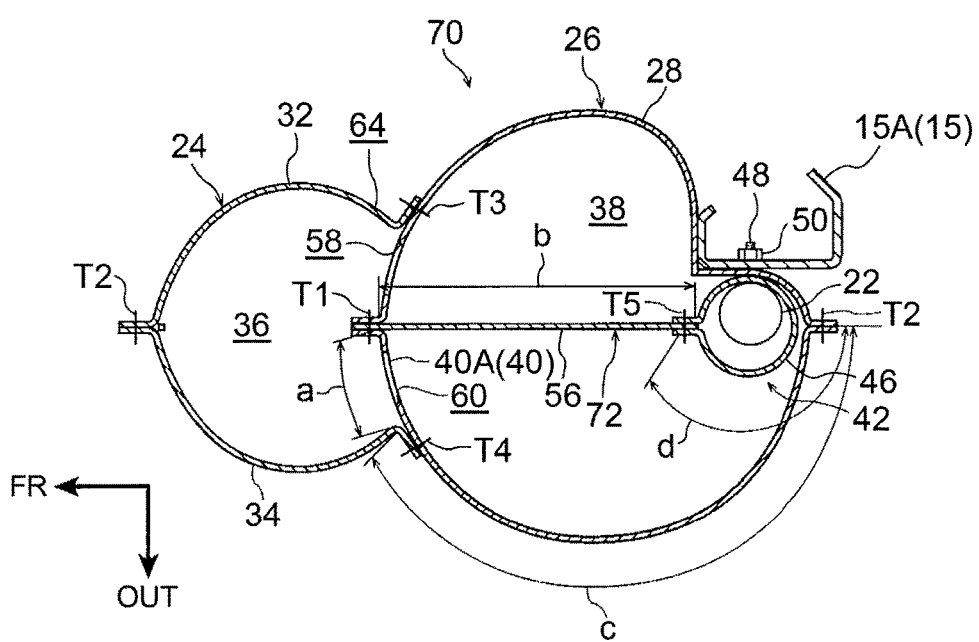
FIG. 8 is a sectional view corresponding to FIG. 3, and shows an inflating and deploying state of a side airbag that is a component of a side airbag device for a vehicle according to a second embodiment of the present invention.

In FIG. 8, an inflating and deploying state of a side airbag 70 that is a component of a side airbag device for a vehicle according to a second embodiment of the present invention is shown in a sectional view corresponding to FIG. 3. In the second embodiment, the rear edge of the tension cloth 56 is stitched to the rectifying cloth 42 at the seam T5, and a stretchable member 72 is formed by the tension cloth 56 and the rectifying cloth 42. This means that, in the second embodiment, part of the stretchable member 72 is formed by the rectifying cloth 42 (rectifying member).

In the second embodiment, in a flat developed state of the side airbag 70, the front-rear partition 40 is folded into two in a manner as to protrude toward the rear bag section 26 along a folded portion thereof located at the center portion in the vehicle width direction. In the state, dimensions of each component of the side airbag 70 are so defined as to cause no redundancy in any of the front-rear partition 40, the base fabrics 28, 30 of the rear bag section 26, and the stretchable member 72. Specifically, it is configured that if a width dimension of the vertical partition 40A is defined as 2a, a linear dimension of the tension cloth 56 along the front-rear direction of the side airbag 20 is defined as b, a circumferential length of the rectifying cloth 42 is defined as 2d, and a dimension obtained by subtracting the above 2a from the circumferential length of the rear bag section 26 is defined as 2c, a relation of a+b+d=c is satisfied.

Accordingly, in the second embodiment, the same operational effect can basically be attained as that of the aforementioned first embodiment. In addition, part of the stretchable member 72 is commonly used as the rectifying member, thus simplifying the configuration of the side airbag 70.

Third Embodiment

Figure 9:
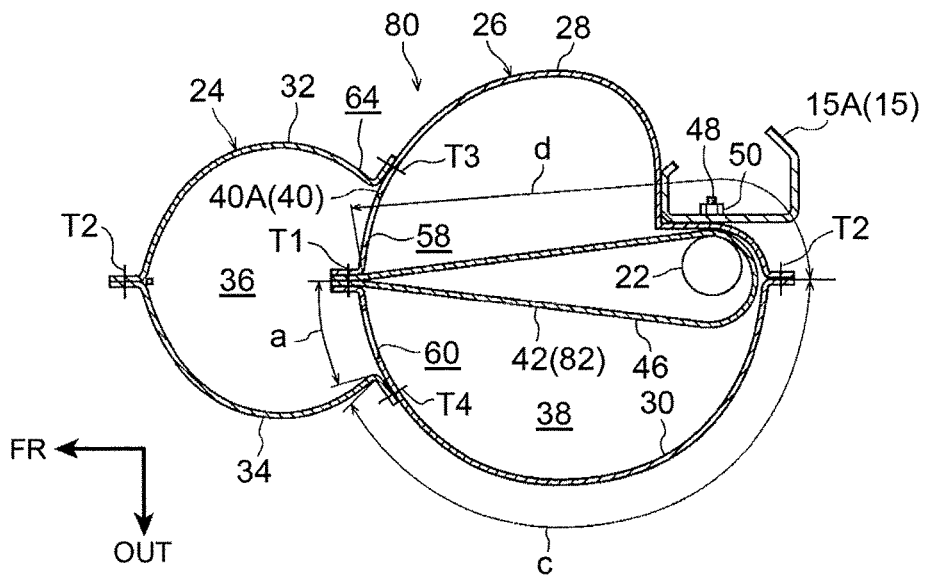
FIG. 9 is a sectional view corresponding to FIG. 3, and shows an inflating and deploying state of a side airbag that is a component of a side airbag device for a vehicle according to a third embodiment of the present invention.
Figure 10:
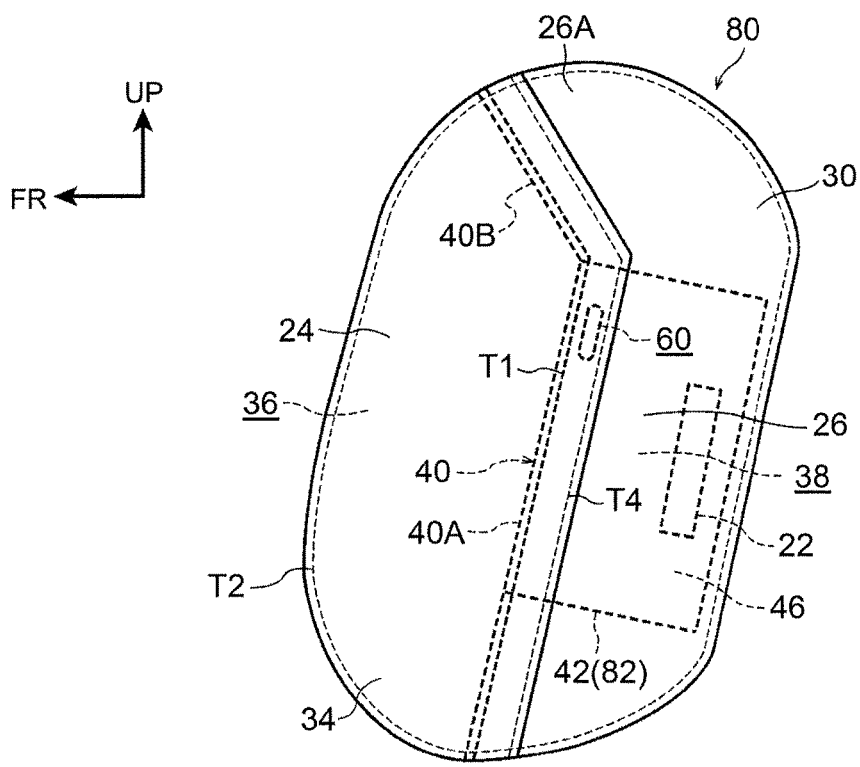
FIG. 10 is a side view corresponding to FIG. 2, and shows the inflating and deploying state of the side airbag.

In FIG. 9, an inflating and deploying state of a side airbag 80 that is a component of a side airbag device for a vehicle according to a third embodiment of the present invention is shown in a sectional view corresponding to FIG. 3. In FIG. 10, the inflating and deploying state of the side airbag 80 is shown in a side view corresponding to FIG. 2. In the third embodiment, the tension cloth 56 in the first embodiment is omitted, and an entire stretchable member 82 is formed by the rectifying cloth 42 (rectifying member). In the rectifying cloth 42 (stretchable member 82), the seam T5 is omitted, and the front end of the base fabric 46 extending to the vertical partition 40A is stitched to the center portion in the width direction of the vertical partition 40A at the seam T1.

In the third embodiment, in the flat developed state of the side airbag 80, the front-rear partition 40 is folded into two in a manner as to protrude toward the rear bag section 26 along a folded portion thereof located at the center portion in the vehicle width direction. In the state, dimensions of each component of the side airbag 80 is so defined as to cause no redundancy in any of the front-rear partition 40, the base fabrics 28, 30 of the rear bag section 26, and the stretchable member 82. Specifically, it is configured that if the width dimension of the vertical partition 40A is defined as 2a, a circumferential length of the stretchable member 82 (rectifying cloth 42) is defined as 2d, and a dimension obtained by subtracting the above 2a from the circumferential length of the rear bag section 26 is defined as 2c, a relation of a+d=c is satisfied.

Accordingly, in the third embodiment, the same operational effect can basically be attained as that of the aforementioned first embodiment. In addition, the entire stretchable member 82 is commonly used as the rectifying cloth 42 (rectifying member), thus simplifying a configuration of the side airbag 80.

Fourth Embodiment

Figure 11:
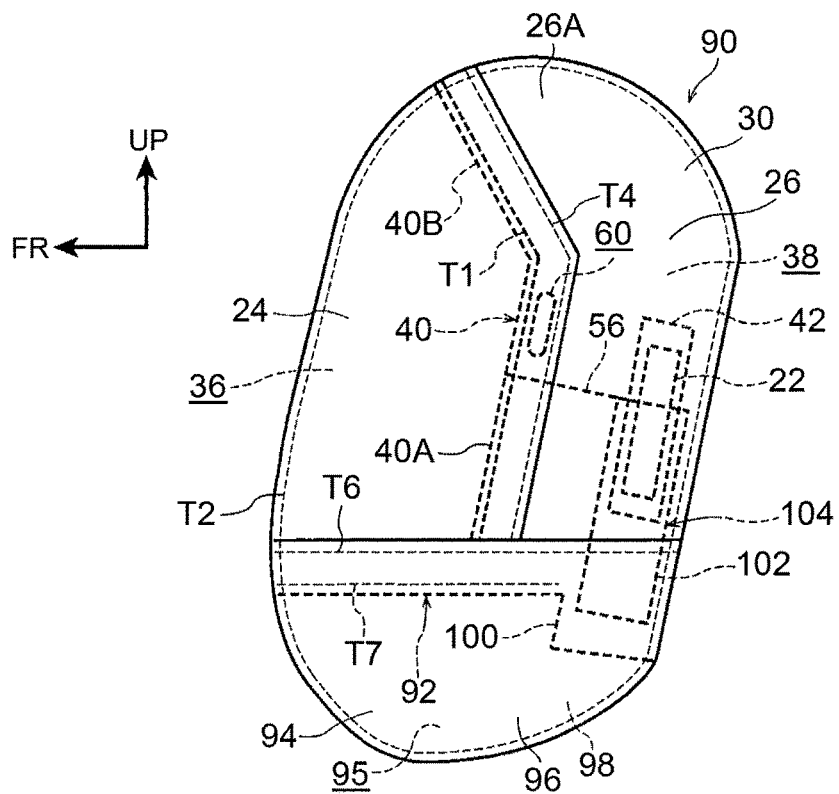
FIG. 11 is a side view corresponding to FIG. 2, and shows an inflating and deploying state of a side airbag that is a component of a side airbag device for a vehicle according to a fourth embodiment of the present invention.
Figure 12:
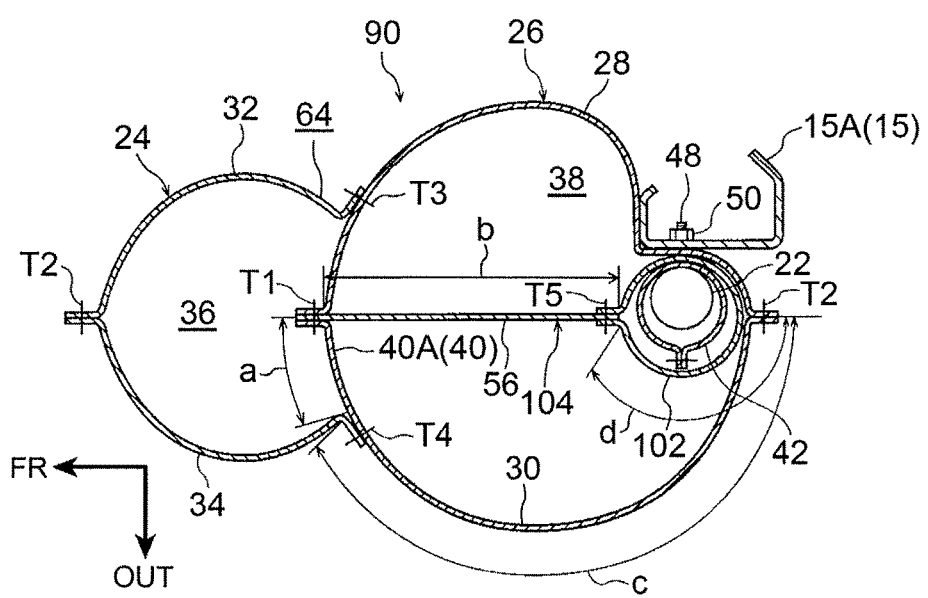
FIG. 12 is a side view corresponding to FIG. 3, and shows the inflating and deploying state of the side airbag.

In FIG. 11, an inflating and deploying state of a side airbag 90 that is a component of a side airbag device for a vehicle according to a fourth embodiment of the present invention is shown in a side view corresponding to FIG. 2. In FIG. 12, the inflating and deploying state of the side airbag 90 is shown in a sectional view corresponding to FIG. 3. The side airbag 90 includes a lower bag section 94 partitioned from the front bag section 24 and the rear bag section 26 by an up-down partition 92. An inside of the lower bag section 94 is defined as a lower chamber 95 partitioned from the front chamber 36 and the rear chamber 38.

The lower bag section 94 is formed by stitching a base fabric 96 and a base fabric 98 overlaid with a back side of the base fabric 96 (back side in a direction vertical to a paper sheet of FIG. 11) as shown in FIG. 11. The base fabrics 96, 98 are stitched at front edges, lower edges, and rear edges thereof along the outer peripheral seam T2. Between the upper edges of the base fabrics 96, 98, lower ends of the front bag section 24 and the rear bag section 26 are inserted, and the lower bag section 94 is stitched to the front bag section 24 and the rear bag section 26 at a seam T6 and a not shown seam. The lower ends of the front bag section 24 and the rear bag section 26 are stitched at a seam T7, and the up-down partition 92 is formed by the lower ends of the front bag section 24 and the rear bag section 26.

At the rear end of the up-down partition 92, the seam T7 is omitted, and there is provided a check valve 100 configured by the base fabrics 28, 30 of the rear bag section 26. The check valve 100 projects toward the lower bag section 94 so as to communicate the inside of the rear bag section 26 and the inside of the lower bag section 94 with each other through the check valve 100. A lower end of a lumbar rectifying cloth 102 (outer rectifying member) provided inside the rear bag section 26 is inserted into the check valve 100. The lumbar rectifying cloth 102 basically has the same configuration as that of the rectifying cloth 42 of the second embodiment, and is connected to the rear end of the tension cloth 56 at the seam T5. Specifically, in the fourth embodiment, as similar to the second embodiment, a stretchable member 104 is configured by the lumbar rectifying cloth 102 and the tension cloth 56.

In addition, inside the rear bag section 26, there is provided the rectifying cloth 42 (inner rectifying member) that is the same as the rectifying cloth 42 in the first embodiment. The lower portion of the rectifying cloth 42 is inserted from an upper end aperture of the lumbar rectifying cloth 102 into the lumbar rectifying cloth 102. The inflator 22 is housed inside the rectifying cloth 42, and the stud bolts 48 of the inflator 22 extend through the rectifying cloth 42, the lumbar rectifying cloth 102, the base fabric 28, and the side frame 15A, and are screwed with the nuts 50.

In the fourth embodiment, in a flat developed state of the side airbag 90, the front-rear partition 40 is folded into two in a manner as to protrude toward the rear bag section 26 along a folding portion thereof located at the center portion in the width direction. In the state, dimensions of each component of the side airbag 90 are so defined as to cause no redundancy in any of the front-rear partition 40, the base fabrics 28, 30 of the rear bag section 26, and the stretchable member 104. Specifically, it is configured that if a width dimension of the vertical partition 40A is defined as 2a, a linear dimension of the tension cloth 56 along the front-rear direction of the side airbag 20 is defined as b, a circumferential length of the rectifying cloth 42 is defined as 2d, and a dimension obtained by subtracting the above 2a from the circumferential length of the rear bag section 26 is defined as 2c, a relation of $a+b+d=c$ is satisfied.

Accordingly, in the fourth embodiment, the same operational effect can basically be attained as that of the aforementioned second embodiment. In addition, in the fourth embodiment, when the inflator 22 is activated, the gas for inflation and deployment is guided into the lower bag section 94 by the lumbar rectifying cloth 102 that is part of the stretchable member 104, thus simplifying the configuration of the side airbag 90 including the lower bag section 94.

Furthermore, in the fourth embodiment, the gas injected from the inflator 22 is rectified by the rectifying cloth 42 and the lumbar rectifying cloth 102, and is then supplied into the rear bag section 26 and the lower bag section 94. Hence, the dimensions and others of the rectifying cloth 42 and the lumbar rectifying cloth 102 are appropriately changed, thereby readily changing a distribution ratio of the gas into the rear bag section 26 and the lower bag section 94. In addition, the rectifying cloth 42 and the lumbar rectifying cloth 102 are both formed of cloth; therefore, for example, compared with the case of using a diffuser made of metal, it is possible to compactly fold the side airbag 90.

In the fourth embodiment, since the lumbar rectifying cloth 102 is connected to the vertical partition 40A through the tension cloth 56, it is possible to stably retain the lumbar rectifying cloth 102 with tension of the tension cloth 56 at the time of inflating and deploying of the side airbag 90. Furthermore, in the fourth embodiment, if the inner pressure of the lower bag section 94 becomes increased to not less than a predetermined value, the check valve 100 is pressed and crushed, thereby restricting (including the case of completely shutting off) the gas flow from the inside of the lower bag section 94 into the rear bag section 26. Therefore, it is possible to maintain the inner pressure of the lower bag section 94 at a high pressure for a long time; therefore, it is possible to effectively restrain the lumbar region L having a relatively high load resistance in the body of the occupant P by the lower bag section 94. In addition, the check valve 100 is configured by using the base fabrics 28, 30 of the rear bag section 26; therefore it is possible to simplify the configuration of the side airbag 20 compared with the case of configuring the check valve 100 by using a material of a different body from the base fabrics 28, 30 of the rear bag section 26.

Fifth Embodiment

Figure 13:
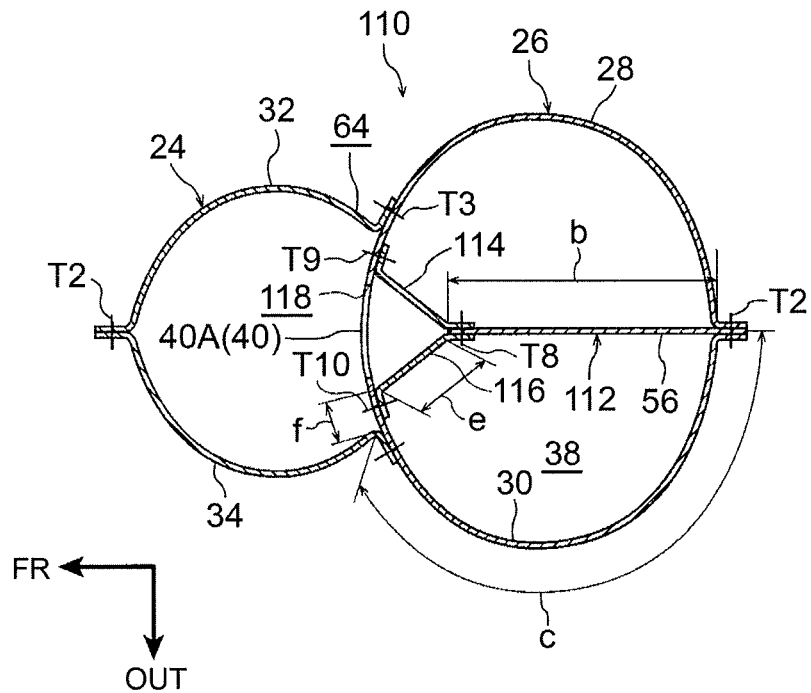
FIG. 13 is a sectional view corresponding to FIG. 3, and shows an inflating and deploying state of a side airbag that is a component of a side airbag device for a vehicle according to a fifth embodiment of the present invention.

In FIG. 13, an inflating and deploying state of a side airbag 110 that is a component of a side airbag device for a vehicle according to a fifth embodiment of the present invention is shown in a sectional view corresponding to FIG. 3. In the fifth embodiment, a configuration of a stretchable member 112 is different from that of the first embodiment. In the stretchable member 112, a pair of right and left cloth pieces 114, 116 are stitched to the front end of the tension cloth 56 at a seam T8, and the front end of the stretchable member 112 is branched into two if viewed from the up-down direction of the side airbag 110. The branched front ends of the stretchable member 112 are stitched to the vertical partition 40A at seams T9, T10. In the fifth embodiment, in the vertical partition 40A, there are formed one or plural communicating ports 118 that communicate the inside of the front bag section 24 and the inside of the rear bag section 26 with each other between the ends branched into two of the stretchable member 112. Illustrations of the inflator 22 and the rectifying cloth 42 are omitted in FIG. 13.

In the fifth embodiment, in a flat developed state of the side airbag 110, the front-rear partition 40 is folded into two in a manner as to protrude toward the rear bag section 26 along a folded portion thereof located at the center portion in the vehicle width direction. In the state, dimensions of each component of the side airbag 110 are so defined as to cause no redundancy in any of the front-rear partition 40, the base fabrics 28, 30 of the rear bag section 26, and the stretchable member 112. Specifically, it is configured that if a linear dimension of the tension cloth 56 is defined as b, a linear dimension from the tension cloth 56 to the vertical partition 40A in each cloth piece 114, 116 is defined as e, a linear dimension of a portion in the vertical partition 40A located outward in the width direction of each cloth piece 114, 116 is defined as f, and a dimension obtained by subtracting the width dimension of the vertical partition 40A from the circumferential length of the rear bag section 26 is defined as 2c, a relation of $b+e+f=c$ is satisfied.

Accordingly, in the fifth embodiment, the same operational effect can basically be attained as that of the aforementioned first embodiment. In addition, the front end of the stretchable member 112 connected to the vertical partition 40A is branched into two if viewed in the up-down direction of the side airbag 110, and thus it is possible to prevent a tensile force inputted into the vertical partition 40A from being concentrated on a single position of the vertical partition 40A at the time of tensing the stretchable member 112. Accordingly, it is possible to suppress unprepared bending of the vertical partition 40A at the time of tensing the stretchable member 112 (i.e., at the time of inflation and deployment of the side airbag 110). In addition, in the fifth embodiment, since the aforementioned communicating ports 118 are formed in the vertical partition 40A, even in the configuration of providing the stretchable member 112 of which front end is branched into two across between the vertical partition 40A and the rear end of the rear bag section 26, the gas generated from the inflator 22 inside the rear bag section 26 can be supplied to the center portion in the width direction in the front bag section 24. Accordingly, it is possible to stabilize the deploying behavior of the side airbag 110.

In each embodiment, it is configured that the rear bag section 26 includes the front extending portion 26A, but the present invention is not limited to this, and it may be configured that the front extending portion 26A is omitted, that is, the portion corresponding to the front extending portion 26A is formed by the front bag section 24.

Figure 14:
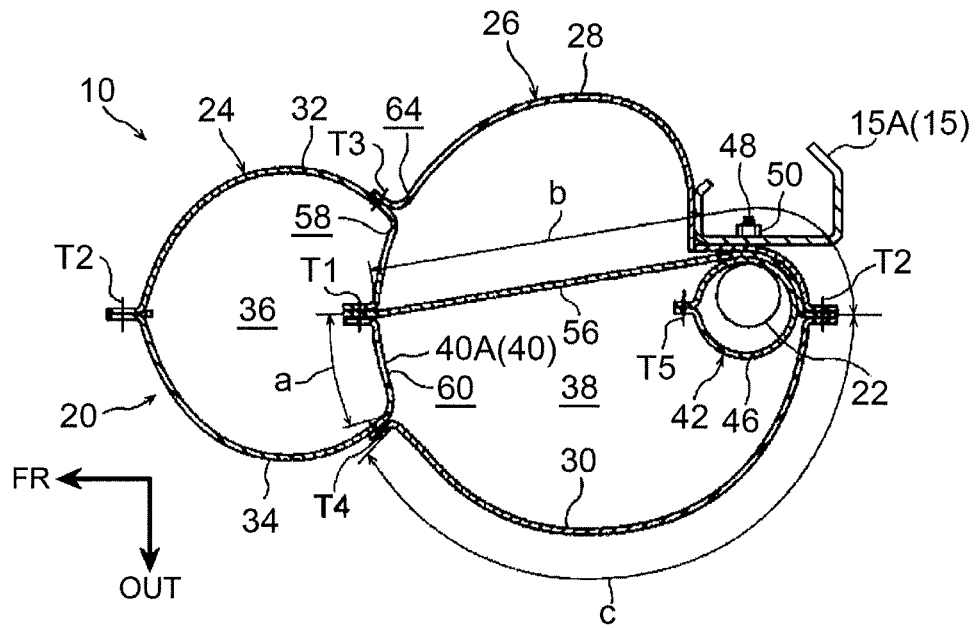
FIG. 14 is a sectional view corresponding to FIG. 3, and shows a variation of the side airbag according to the first embodiment of the present invention.

In each embodiment, the case in which the front-rear partition 40 is configured by part of the base fabrics 28, 30 of the rear bag section 26 (front portion of the rear bag section 26) has been explained, but the present invention is not limited to this. Specifically, as a variation as shown in FIG. 14, the front-rear partition 40 may also be configured by part of the base fabrics 32, 34 of the front bag section 24 (rear portion of the front bag section 24).

In addition, the present invention may be changed and carried out without departing from the scope of the invention. In addition, it is needless to mention that the scope of rights of the present invention is not limited to each aforementioned embodiment.

The disclosure of Japanese Patent Application No. 2013-139720 is incorporated herein by reference in its entirety. All publications, patent applications, and technical standards described in the present specification are herein incorporated by reference to the same extent as if each individual publication, patent application, or technical standard was specifically and individually indicated to be incorporated by reference.

What is claimed is:

1. A side airbag device for a vehicle comprising:
   a gas generator provided to a vehicle seat, the gas generator activated so as to generate gas for inflation and deployment; and
   a side airbag partitioned by a front-rear partition in a sheet shape into a front bag section and a rear bag section, the side airbag housed in a folded-up state in a side section of a seat back of the vehicle seat, the side airbag brought to inflate and deploy toward a vehicle front direction of the side section by supplying the gas for inflation and deployment into each of the bag sections, wherein
   in a flat developed state of the side airbag, the front-rear partition is folded into two in a manner as to protrude toward the rear bag section along a folded portion thereof located at a center portion in a width direction, and a stretchable member is extendingly disposed across between the front-rear partition and a rear end of the rear bag section, and in an inflating and deploying state of the side airbag, the stretchable member is stretched so as to restrict inflation in a vehicle front-rear direction of the rear bag section.

2. The side airbag device for a vehicle according to claim 1, wherein
   the stretchable member is connected to a center portion in a width direction of the front-rear partition.

3. The side airbag device for a vehicle according to claim 1, wherein
   an entire or part of the stretchable member is configured by a rectifying member that rectifies the gas for inflation and deployment.

4. The side airbag device for a vehicle according to claim 3, wherein
   the side airbag includes a lower bag section partitioned by an up-down partition from the front bag section and the rear bag section, and
   the gas for inflation and deployment is guided by the rectifying member forming the part of the stretchable member into the lower bag section.

5. The side airbag device for a vehicle according to claim 4, wherein
   the gas from the gas generator disposed inside the rear bag section is supplied into the lower bag section, and
   the side airbag is provided with a check valve that restricts a gas flow from an inside of the lower bag section to an inside of the rear bag section.

6. The side airbag device for a vehicle according to claim 1, wherein
   at upper and lower two portions on both sides of the front-rear partition with the stretchable member located therebetween or on either one side of the front-rear partition, there are formed a pair of communicating ports that communicate an inside of the front bag section and the inside of the rear bag section with each other, and
   the gas from the gas generator disposed inside the rear bag section is supplied through the pair of communicating ports into the front bag section.

7. The side airbag device for a vehicle according to claim 1, wherein
   a front end of the stretchable member branched into two if viewed from the up-down direction of the side airbag is connected to the front-rear partition.

8. The side airbag device for a vehicle according to claim 7, wherein
   in the front-rear partition, communication ports that communicate the inside of the front bag section and the inside of the rear bag section with each other are formed between the branched front ends of the stretchable member.

9. The side airbag device for a vehicle according to claim 1, wherein
   an upper portion of the front-rear partition is configured to be an upper partition obliquely upwardly extending in a frontward direction of the seat back in the inflating and deploying state of the side airbag, and
   a front extending portion disposed above the rear bag section is partitioned from the front bag section by the upper partition.

10. The side airbag device for a vehicle according to claim 1, wherein
    the front-rear partition is configured by part of base fabrics of the front bag section or the rear bag section.

11. The side airbag device for a vehicle according to claim 1, further comprising
    a rectifying member that is formed in a cylindrical shape, is disposed inside the rear bag section, and houses the gas generator thereinside,
    wherein
    the gas for inflation and deployment is supplied from upper and lower apertures of the rectifying member into the rear back section.

12. The side airbag device for a vehicle according to claim 1, wherein
    in the flat developed state, dimensions of each component of the side airbag are so defined as to cause no redundancy in any of the front-rear partition, the base fabrics of the rear bag section, and the stretchable member.

13. The side airbag device for a vehicle according to claim 5, wherein the check valve is configured by the base fabrics of the rear bag section, and projects inside the lower bag section.

14. The side airbag device for a vehicle according to claim 13, wherein
the rectifying member includes an outer rectifying member and an inner rectifying member each of which is formed in a cylindrical shape having apertures at upper and lower portions thereof,
the outer rectifying member forms part of the stretchable member, and a lower portion of the outer rectifying member is inserted into the check valve, and
the inner outer rectifying member houses the gas generator thereinside, and a lower portion of the inner rectifying member is inserted into the outer rectifying member.

* * * * *